(No Model.)  4 Sheets—Sheet 1.

T. L. RANKIN.
ICE MACHINE.

No. 270,193.  Patented Jan. 2, 1883.

ATTEST:
Julian A. Hurdle.
F. M. Burnham.

INVENTOR:
T. L. Rankin
per J. H. Alexander
Attorney.

(No Model.)  T. L. RANKIN.  4 Sheets—Sheet 2.
ICE MACHINE.

No. 270,193.  Patented Jan. 2, 1883.

ATTEST:
Julian A. Wardle.
F. M. Burnham.

INVENTOR:
T. L. Rankin
per. H. W. Alexander
Attorney.

(No Model.) 4 Sheets—Sheet 3.

T. L. RANKIN.
ICE MACHINE.

No. 270,193. Patented Jan. 2, 1883.

ATTEST:
Julian A. Hurdle.
F. M. Burnham.

INVENTOR:
T. L. Rankin
per W. H. Alexander
Attorney.

(No Model.)

4 Sheets—Sheet 4.

T. L. RANKIN.
ICE MACHINE.

No. 270,193.

Patented Jan. 2, 1883.

ATTEST:
Julian A. Hurdle.
F. M. Burnham.

INVENTOR:
T. L. Rankin,
per W. W. Alexander
Attorney.

UNITED STATES PATENT OFFICE.

THOMAS L. RANKIN, OF NEW YORK, N. Y.

ICE-MACHINE.

SPECIFICATION forming part of Letters Patent No. 270,193, dated January 2, 1883.

Application filed July 21, 1882. (No model.)

*To all whom it may concern:*

Be it known that I, THOMAS L. RANKIN, of New York, in the county and State of New York, have invented certain new and useful Improvements in Ice-Machines; and I do hereby declare that the following is a full, clear, and exact description thereof, reference being had to the accompanying drawings, and to the letters of reference marked thereon, which form part of this specification, in which—

Figure 1:
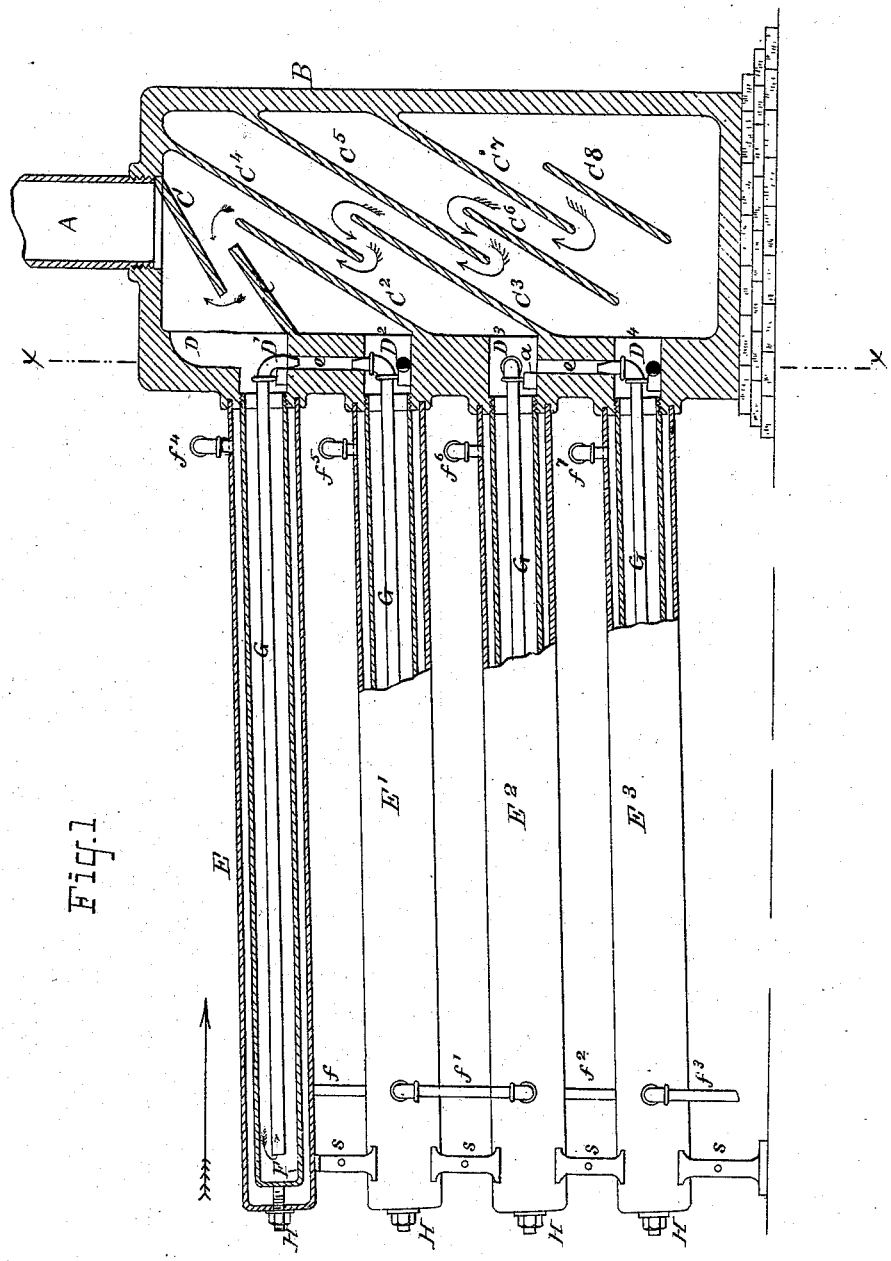
Figure 4:
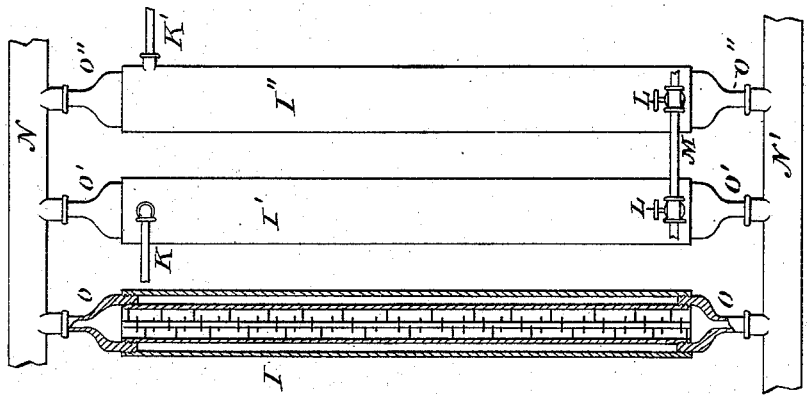
Figure 6:
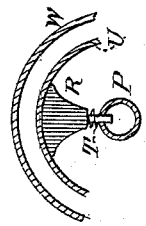
Figure 3:
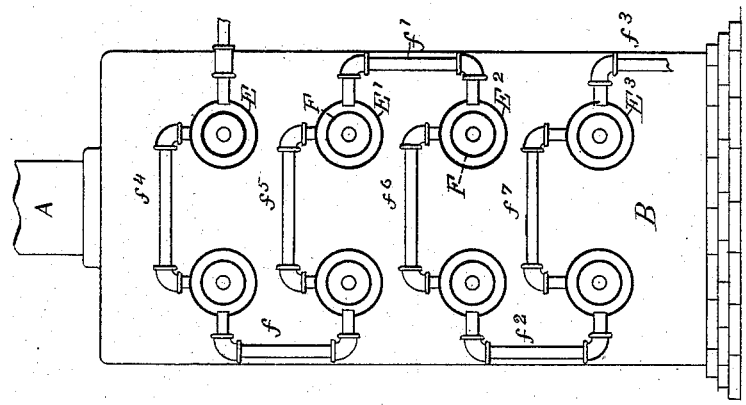
Figure 5:
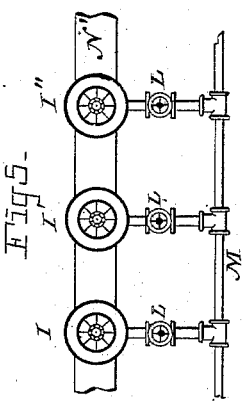
Figure 2:
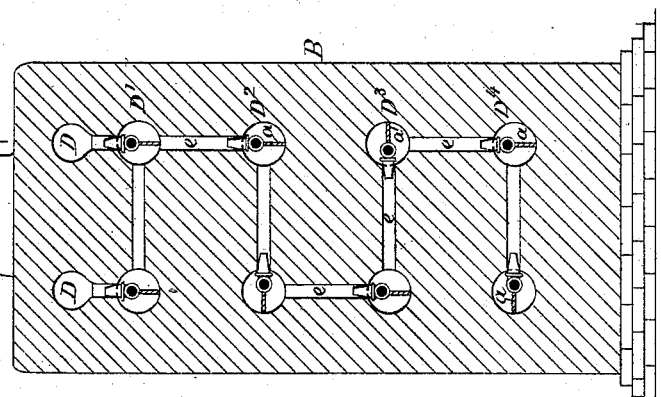
Figure 7:
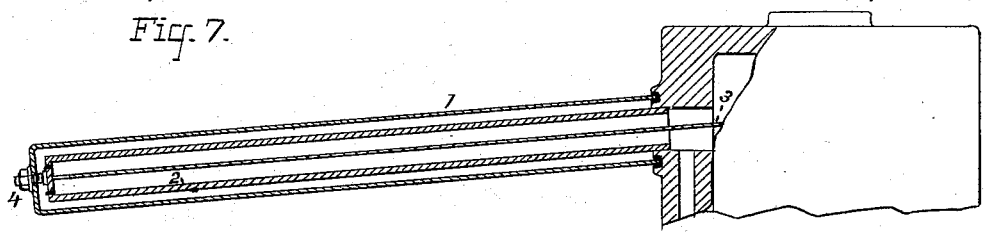
Figure 8:
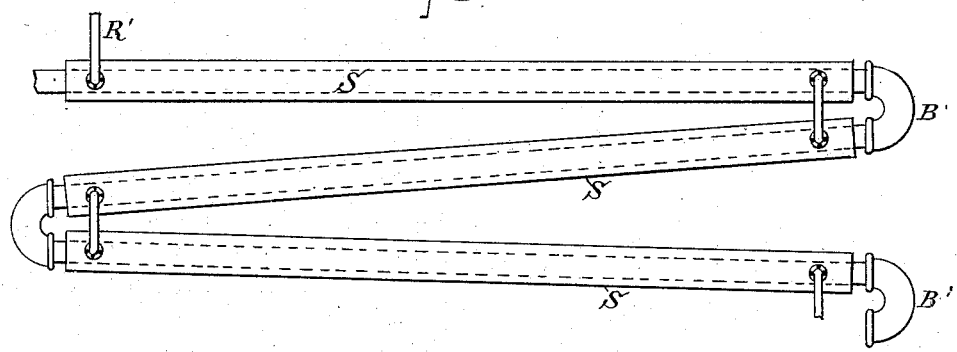
Figure 9:
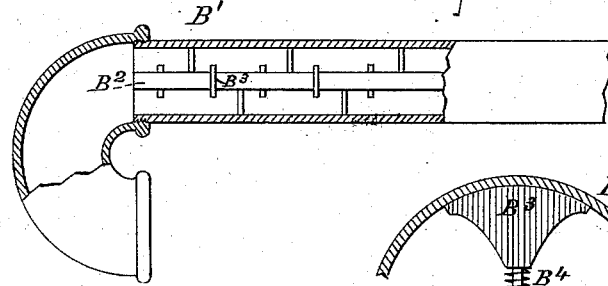
Figure 10:
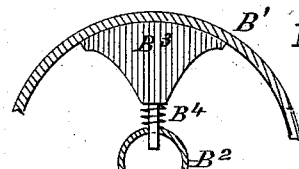
Figure 11:
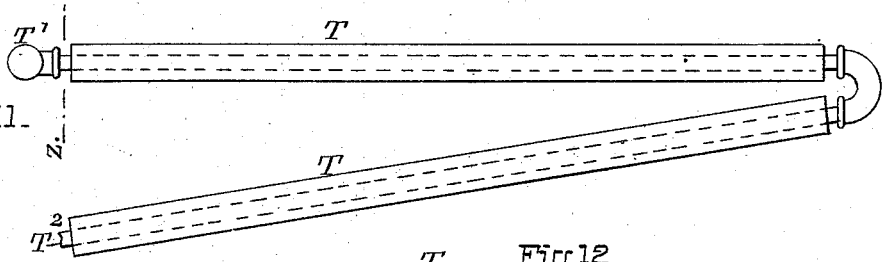
Figure 12:
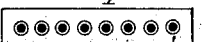
Figure 13:
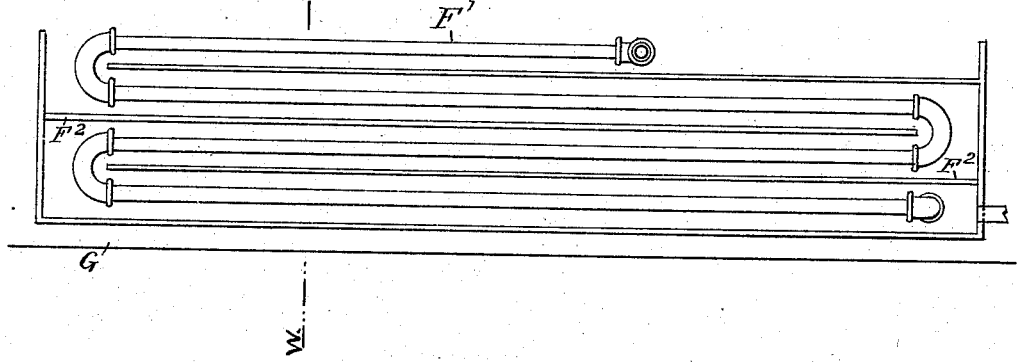
Figure 14:
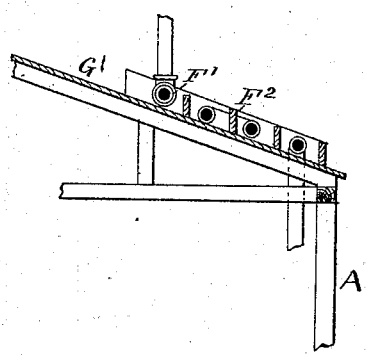

Figure 1 is a still and still-chamber, partly in vertical section, designed for the rapid evaporation of aqua-ammonia for the production of ice and for refrigerating purposes generally. Fig. 2 is a section taken through Fig. 1 in the vertical plane, indicated by dotted line $x\ x$, showing the cored passages leading from one pipe to another throughout the series of pipes. Fig. 3 is a front elevation of the still, as seen by looking in the direction of the arrow on Fig. 1. Fig. 4 is a view in detail, showing a side view of two condensing and absorbing pipes, and a diametrical section of one of these pipes adapted to be used vertically. Fig. 5 is a top view of Fig. 4, parts of which are omitted. Fig. 6 is an enlarged sectional view of portions of the condensing and absorbing pipes, showing one of the spring-actuated segmental drip-plates. Fig. 7 is a sectional view of the upper part of the still-chamber and one of the inclined still-tubes, with its steam-jacket, and a central diaphragm perforated at its lower end. Fig. 8 is a view of a condenser or absorber. Fig. 9 is an enlarged view, partly in section, of one of the condensing and absorbing pipes, showing segmental plates therein. Fig. 10 is an enlarged cross-section of part of Fig. 9. Fig. 11 is a modification of part of a condenser. Fig. 12 is a cross section, showing a multiple of pipes in a condensing-jacket of rectangular form. Fig. 13 is a portion of a cooling-coil to cool the weak water of ammonia as it flows from the still to the absorber; and Fig. 14 shows in section the cooling-coil of Fig. 13 arranged on the roof of a building.

This invention relates to certain novel improvements on ammonia ice-making machines; and the nature of my invention consists in certain novel contrivances, which are especially applicable to such machinery when the still employed for the rapid vaporization or gasifying of the aqua-ammonia is heated by steam.

The following description of my invention, when taken in connection with the annexed drawings, will enable others skilled in the art to fully understand it and to carry it into effect.

B designates a still-chamber, from which rises a stand-pipe, A, only part of which is shown in the drawings, through which the gas from the ammonia passes to be condensed. This chamber B is provided with a number of inclined plates, C C', arranged so that the ascending gas and vapor are caused to take a tortuous course in passing upward to the stand-pipe A, as indicated by the arrows in Fig. 1. The inclined plates C' rise from a series of horizontal passages, which are lettered D, and which extend transversely through a thick wall of the chamber B. These passages communicate with vertical and horizontal passages $e\ e$, shown clearly in Fig. 2, and formed by coring the said thick wall.

E E designate a gang or series of still-jackets, which are inclined, as shown, and which surround pipes F, in the centers of which are arranged pipes G. The jackets E are closed at their lower ends, and their upper ends are fitted into annular grooves $a$, formed in the wall of the chamber B, and so nicely packed that they are gas-tight at these packed joints. The lower ends of the pipes F are closed, and secured by bolts and nuts to the corresponding ends of the jackets E. The upper ends of the pipes F are suitably fitted and secured into the passages D and open therein. The lower ends of the pipes G are open, and their upper ends are secured to couplings, which are tightly fitted into the horizontal and vertical passages $e\ e$, as clearly shown in Figs. 1 and 2. There is a steam-space formed between each one of the jackets E and the pipe F, which it incloses, and these steam-spaces communicate by means of vertical and horizontal pipes $f\ f'$, as shown in Figs. 1 and 3. The struts $s$ serve as supports for the outer ends of the jackets, and the bolts and nuts H serve to press home the upper ends of the jackets into their seats $a$.

It will be seen that when aqua-ammonia is caused to flow down the stand-pipe A it will pass into pipe F nearest the top of the chamber B, and when this pipe is one-third full (more or less) the liquid will flow through the vertical passage e into the pipe G, and from the lower end of this pipe into the pipe F, which surrounds it, thence back again, and so on through the series of pipes G F. The liquid, which becomes very weak in consequence of being deprived of ammonia by the steam heat, finally flows into the bottom of the chamber B, to be passed out by the gas-pressure when desired.

Instead of using the pipes G for conveying the liquid ammonia to the lower ends of the pipes F, a diaphragm may be used, as shown in Fig. 7, having a perforation through it at its lower end for the passage of the liquid from the chamber above it to that below it.

The gas which escapes from the upper part of the stand-pipe A is conducted through a condenser. This condenser consists of an outer jacket or cylinder, I, which is arranged vertically and secured gas-tight to ends O O', an inner cylinder, I', of much less diameter than the jacket, which cylinder is also secured to said ends O O', and a central rod or shaft, P. The upper end of the end piece, O, communicates with a horizontal pipe, N, and the end piece, O', communicates with a pipe, N'. The chamber between the cylinder and jacket is supplied by a constant current of cold water, which enters through pipes M and cocks L, and escapes through pipes K; or the currents may be reversed. The gas passes from N down through the interior of the cylinder I' and escapes into N', from which it may be conducted to a receiver.

It will be seen, by reference to Figs. 4, 5, and 6, that I arrange segments R inside of the cylinder I', and keep them in close contact with the interior surface of this cylinder by means of helical springs T, which are coiled around pins that enter the rod or tube P. These segment-shaped plates are arranged spirally around the said rod or tube P, and they afford a very large amount of surface for condensation or absorption.

The condenser shown by Fig. 8 consists of a coil of pipe, B', partly inclosed by jackets S, which communicate with each other by means of pipes R'. An equivalent of this arrangement is represented by Figs. 11 and 12, in which latter instance a number of small pipes are inclosed by a single rectangular jacket, through which water may be caused to flow.

The condenser of Fig. 9 is provided with spring-actuated segments R, constructed and arranged around a central tube or rod, as described for Figs. 4, 5, and 6.

Figs. 13 and 14 represent a cooling-coil, F', arranged on a roof, G', in a shallow tank, having divisions applied between the coils of pipes, forming channels for the flow of water in a zigzag course from above downward. This arrangement is designed to cool the weak water of ammonia as it flows from the still to the absorber for the purpose of taking up the gas used in refrigerating. This coil is placed on the roof G to gather the water after it has escaped from the condenser and absorber. This water flows down the zigzag channel, while the hot water passes up through the coil.

Having described my invention, I claim—

1. The combination, with the chamber B of the still provided with inclined plates C C and a stand-pipe, the steam-jackets E, pipes F, the pipes G, or their equivalents, and the passages D e in the wall of the said chamber, substantially as described.

2. The combination of the still-chamber B, the wall thereof having passages D e in it, the steam-jackets E, fitted into said wall, the pipes F, and the bolts and nuts H, connecting the lower ends of these pipes to the ends of the jackets, substantially as described.

3. The condenser formed of pipes I I, end pieces, O O', pipes N N', a central rod or tube, P, and segment-shaped plates acted on by springs, substantially as described.

4. In a condenser or absorber, the combination of segment-shaped plates R, acted on by springs, substantially in the manner described.

5. The combination of the cooling-coil F', the tank having divisions F² in it, and the inclined plane of roof G', substantially in the manner and for the purpose described.

In testimony that I claim the foregoing as my own I affix my signature in presence of two witnesses.

THOS. L. RANKIN.

Witnesses:
JOHN H. STITT,
C. S. PHILLIPS.